(12) United States Patent
Chen et al.

(10) Patent No.: US 6,577,505 B1
(45) Date of Patent: Jun. 10, 2003

(54) DISPLAY DEVICE HAVING A MASS PRODUCTION STRUCTURE

(76) Inventors: Shia Chung Chen, 11F, No. 14, Lane 236, Sec. 1, Chuang Jin Road, Taur Yuan City, Taur Yuan Hsien (TW), 330; Peming Hsu, No. 161, Min Tzwu Road, 17 Fu, Nan Men Li, Jin Chen Town, Jin Men Hsien (TW), 893

( * ) Notice: Subject to any disclaimer, the term of this patent is extended or adjusted under 35 U.S.C. 154(b) by 0 days.

(21) Appl. No.: 10/104,513

(22) Filed: Mar. 25, 2002

(51) Int. Cl.⁷ ................................................ H05K 1/14
(52) U.S. Cl. ..................... 361/736; 361/681; 361/809; 361/716
(58) Field of Search ............................. 361/736, 809, 361/824, 748, 679, 715, 716, 681, 720; 428/901

(56) References Cited

U.S. PATENT DOCUMENTS

| | | | | |
|---|---|---|---|---|
| 3,793,563 A | * | 2/1974 | Brefka | 361/627 |
| 3,918,053 A | * | 11/1975 | Towne et al. | 340/815.45 |
| 4,012,117 A | * | 3/1977 | Lazzery | 349/60 |
| 4,092,698 A | * | 5/1978 | Brefka | 361/752 |
| 4,914,731 A | * | 4/1990 | Chen | 340/815.45 |
| 5,867,235 A | * | 2/1999 | Hasegawa | 349/58 |

* cited by examiner

Primary Examiner—David Martin
Assistant Examiner—Hung Bui
(74) Attorney, Agent, or Firm—Charles E. Baxley

(57) ABSTRACT

A display device includes a circuit board having a number of light devices, a plate engaged onto the circuit board and having one or more grooves forming one or more characters or digits, and aligned with the light devices, to receive the light generated by the light devices. A transparent filling or insert is engaged and filled into the grooves of the plate, for allowing the display device to be manufactured by mass production procedures. A number of reflective panels may be engaged into the grooves for reflecting the lights.

1 Claim, 3 Drawing Sheets

DISPLAY DEVICE HAVING A MASS PRODUCTION STRUCTURE

BACKGROUND OF THE INVENTION

1. Field of the Invention

The present invention relates to a display device, and more particularly to a display device having a structure or configuration that may be made or manufactured with mass production procedures.

2. Description of the Prior Art

Typical display devices comprise a panel secured onto a circuit board and having a number of transparent digits or characters or segments formed thereon. The circuit board may include a number of light devices for generating lights through the segments. In addition, a transparent film or membrane should be applied or secured on top of the panel for covering and shielding the panel. The configuration of the typical display devices should be made manually and may not be made or produced by mass production procedures.

The present invention has arisen to mitigate and/or obviate the afore-described disadvantages of the conventional display devices.

SUMMARY OF THE INVENTION

The primary objective of the present invention is to provide a display device including a structure or configuration that may be made or manufactured with mass production procedures.

In accordance with one aspect of the invention, there is provided a display device comprising a circuit board including a plurality of light devices disposed thereon, a plate engaged onto the circuit board and including at least one groove formed therein for forming a digit, and aligned with the light devices, for allowing the light devices to generate and to emit light through the groove, and an insert engaged into the groove of the plate for filling the at least one groove of the plate. The structure or the configuration of the display device is designed and good for mass production procedures.

A housing has the plate secured thereon, and includes a chamber for receiving the circuit board. An adhesive layer is further provided and applied onto the circuit board and the housing for securing the circuit board to the housing.

The plate includes an inner peripheral surface for defining the groove thereof, the display device further includes at least one reflective panel engaged into the groove of the plate, and engaged with the inner peripheral surface of the plate.

The circuit board includes at least one orifice formed therein, the plate includes at least one pin engaged into the orifice of the circuit board for positioning the plate to the circuit board.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
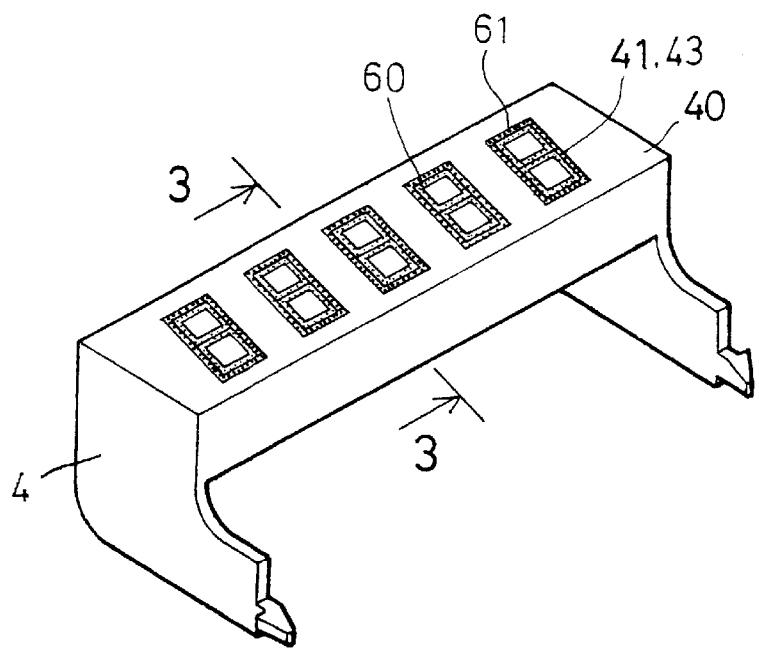
FIG. 1 is a perspective view of a display device in accordance with the present invention.
Figure 2:
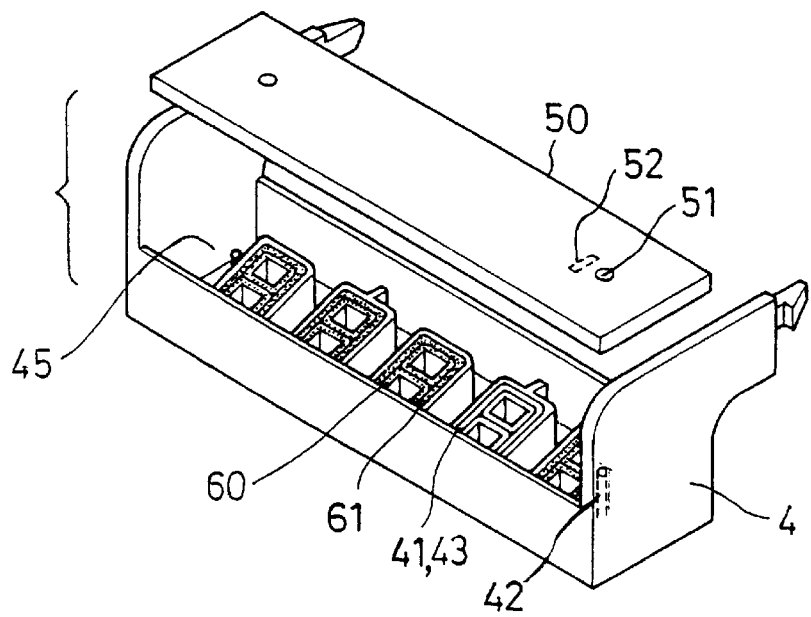
FIG. 2 is a partial exploded view of the display device.
Figure 3:
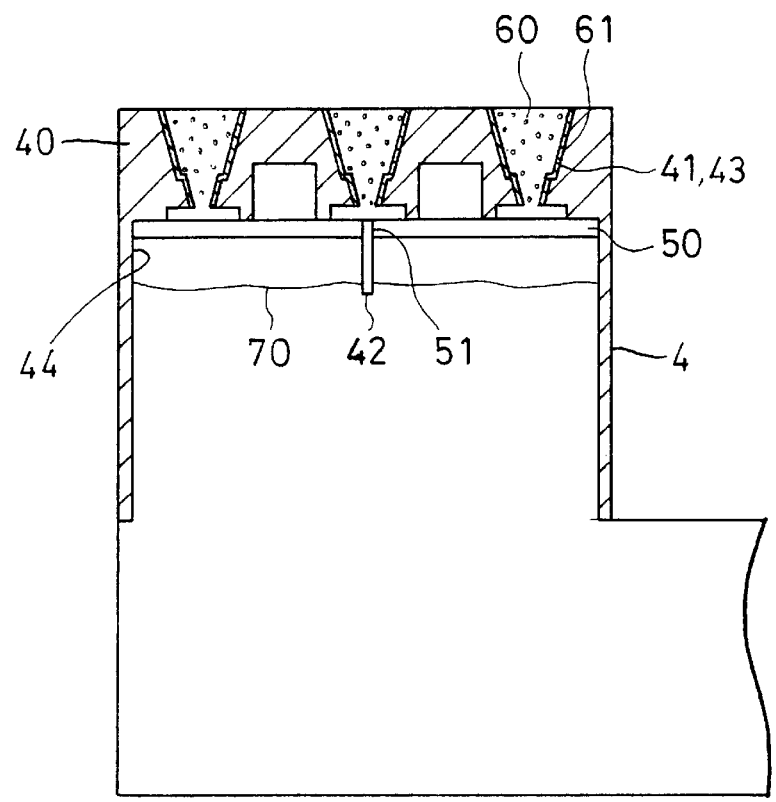
FIG. 3 is a partial cross sectional view taken along lines 3—3 of FIG. 1.

Referring to the drawings, and initially to FIGS. 1–3, a display device in accordance with the present invention comprises a housing 4 including a board or a plate 40 having one or more characters or digits 41 each being formed or defined by one or more slots or grooves 43. For example, the plate 40 may include seven slots or grooves 43 formed therein for forming an 8-shaped digit, corresponding to the seven segments of the digits. The housing 4 includes a chamber 45 formed therein for receiving a circuit board 50, for example, therein. An adhesive material or an adhesive layer 70 (FIG. 3) may further be applied to the circuit board 50 and the housing 4, for solidly securing the circuit board 50 in the housing 4.

The circuit board 50 includes one or more orifices 51 formed therein, the housing 4 includes one or more positioning pins 42 extended therefrom for engaging into the orifices 51 of the circuit board 50 and for positioning or for aligning the circuit board 50 relative to the plate 40 or relative to the digits 41 of the plates 40. The circuit board 50 includes a number of light devices 52, such as the light emitting diodes, disposed thereon, and aligned with the characters 41, such as aligned with the grooves 43 of the plate 40, for generating and emitting light through the grooves 43 of the plate 40.

As best shown in FIG. 3, a number of reflective panels 61 are further provided and engaged in the grooves 43, particularly engaged onto the peripheral surfaces that form or define the grooves 43 of the plate 40. A transparent filling material or insert 60 is engaged into the grooves 43 of the plate 40, by such as a molding process, or a mold injection process, for filling or blocking or sealing the grooves 43 of the plate 40. The display device may thus be manufactured with a mass production process.

It is to be noted that the circuit board 50 may be quickly secured to the plate 40 or to the housing 4, and the inserts 60 and the reflective panels 61 may also be quickly engaged into the grooves 43 of the plate 40 by machines, and with a mass production method. The reflective panels 61 are provided for reflecting the light generated by the light devices 52, and allowing the light to be easily seen by the users.

Figure 4:
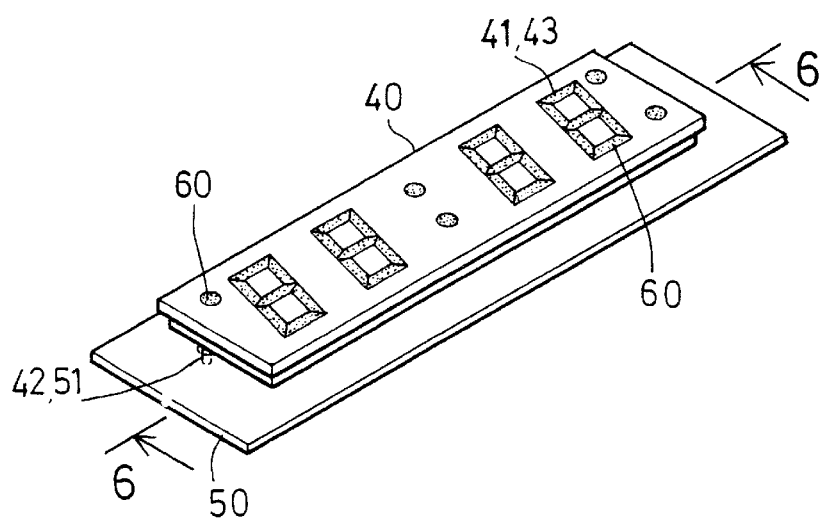
FIG. 4 is a perspective view illustrating the other embodiment of the display device.
Figure 5:
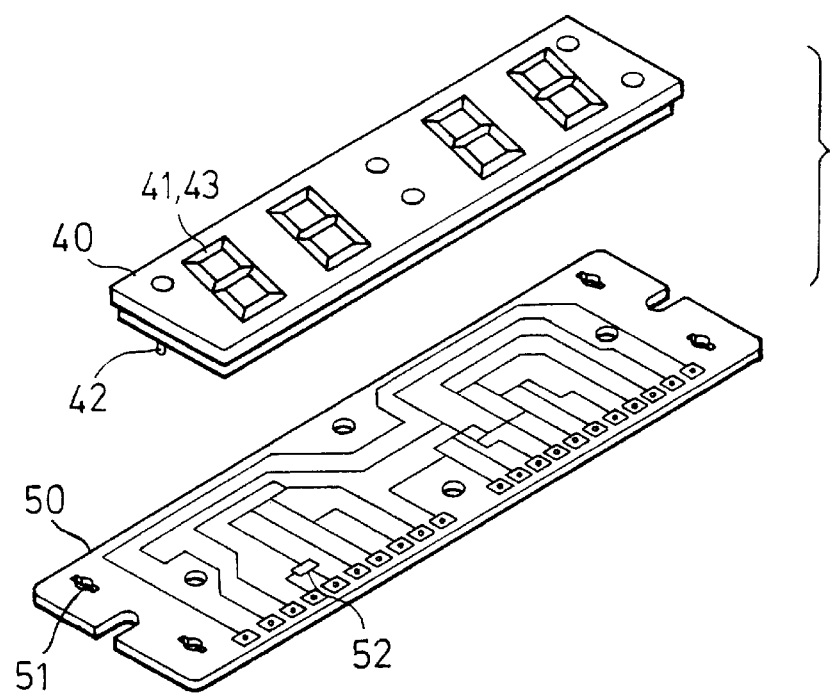
FIG. 5 is a partial exploded view of the display device as shown in FIG. 4.
Figure 6:
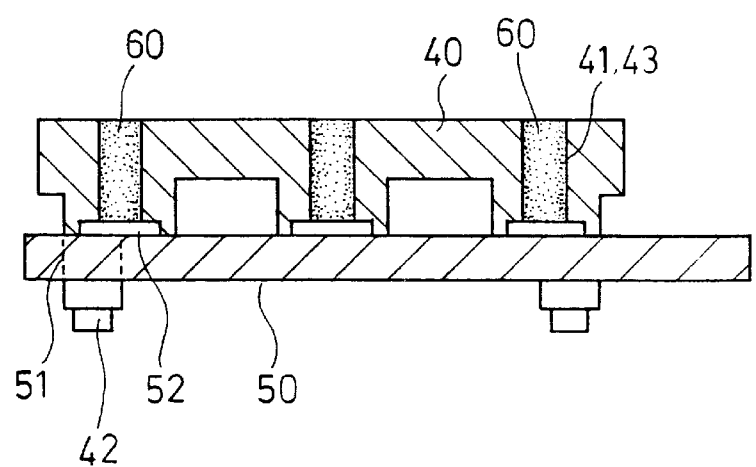
FIG. 6 is a partial cross sectional view taken along lines 6—6 of FIG. 4.

Referring next to FIGS. 4–6, without the housing 4, the plate 40 may be directly secured or engaged onto the circuit board 50 with the engagement of the pins 42 of the plate 40 and the orifices 51 of the circuit board 50. The plate 40 also includes a number of grooves 43 formed therein for forming various kinds of characters or digits 41. Without the reflective panels 61, the light generated by the light devices 52 may also be emitted through the inserts 60.

Accordingly, the display device in accordance with the present invention includes a structure or configuration that may be made or manufactured with mass production procedures.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A display device comprising:

a housing including a plate secured thereon, said housing including a chamber formed therein, a circuit board received in said chamber of said housing, and secured to said housing, and including a plurality of light devices disposed thereon, said plate including at least one groove formed therein to form a digit, and aligned with said light devices, to receive lights from said light devices, said plate including an inner peripheral surface to define said at least one groove thereof, at least one reflective panel engaged into said at least one groove of said plate, and engaged with said inner peripheral surface of said plate, and an insert engaged into said at least one groove of said plate and engaged with said at least one reflective panel, to fill said at least one groove of said plate.

* * * * *